Nov. 1, 1938.  E. A. WALES  2,134,744
FRICTION MATERIAL AND METHOD OF PRODUCING SAME
Filed Dec. 21, 1936
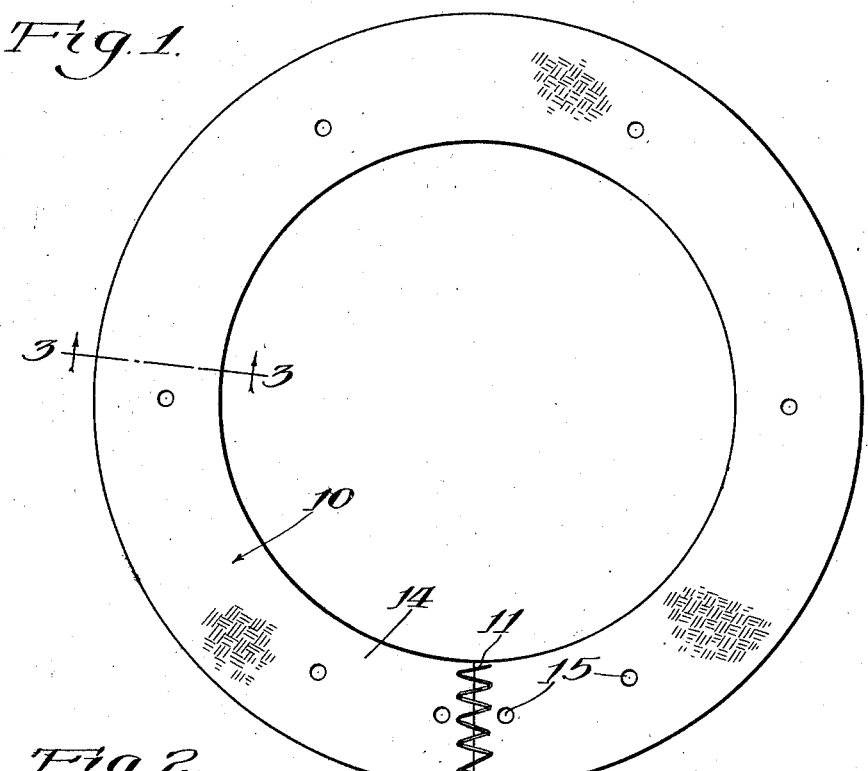
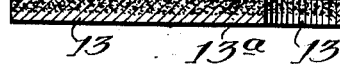
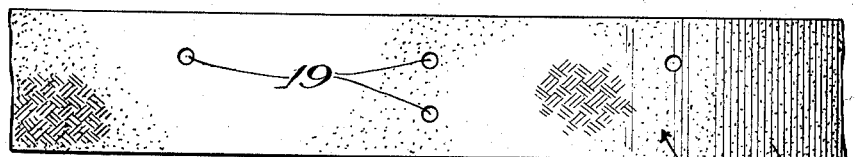
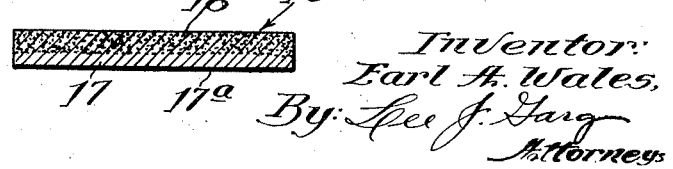

Patented Nov. 1, 1938

2,134,744

UNITED STATES PATENT OFFICE 2,134,744

FRICTION MATERIAL AND METHOD OF PRODUCING SAME

Earl A. Wales, Cleveland, Ohio, assignor to Raybestos-Manhattan, Inc., Bridgeport, Conn., a corporation of New Jersey Application December 21, 1936, Serial No. 117,013

7 Claims. (Cl. 139—383)

The present invention relates to improvements in friction material, for use in clutches and brakes, and to a novel method of producing it.

The novel and improved form of friction material, embodying this invention, among other uses, has been found particularly suitable for use in certain types of automatic transmissions for automobiles. For this purpose a friction material is required which retains its effectiveness in the presence of oil adjacent the operating surface. Generally, the service or load on friction material used for this purpose is not very severe or great. However, the material employed should be of such fabrication that it may be firmly secured to the mounting member and insure maintaining a substantially fixed amount of clearance at the friction surface.

As a result of research and experiment I have found untreated woven cotton very satisfactory for use as the friction face in installations, such as the character above indicated. It will be manifest, however, that certain other materials may be employed with fairly satisfactory results.

One of the objects of this invention is to provide an improved form of friction material having a soft resilient operating surface and a reinforced back for attachment to a mounting member.

Another object is to provide an improved form of friction material formed of woven fibrous strands, and having a porous resilient operating surface and a hardened reinforced back for securement to a mounting member.

A further object resides in the provision of a novel form of friction material composed of woven strands of cotton, the strands constituting the operating surface being untreated, while the strands constituting the back being impregnated with a hard reinforcing binder.

Still another object is to provide an improved form of friction material the operating surface of which is soft and resilient while its back is hard, dense and oil-proof.

And a still further object is to provide an inter-woven plied friction material wherein one of the plies provides a resilient operating surface, and another ply is hard and reinforced to provide strength and a degree of rigidity to certain areas of the material.

It is still a further object of this invention to provide a novel method of producing inter-woven plied friction material wherein the strands of certain plies are untreated and the strands of other plies are impregnated with a binder.

Other objects and advantages of this invention will appear from the following description, taken in connection with the accompanying drawing in which:—

Fig. 1 is a plan view of a clutch facing, embodying the present invention.

Fig. 2 is an edge view.

Fig. 3 is an enlarged section, taken at line 3—3 on Fig. 1.

Fig. 4 is a fragmentary plan view of a brake lining made in accordance with this invention.

Fig. 5 is an edge view of the brake lining.

Fig. 6 is an enlarged section, taken at line 6—6 on Fig. 5.

In the embodiment of the invention illustrated in Figs. 1 to 3, the friction material is initially formed as a tape woven from strands of fibrous material, preferably cotton, and the tape is cut and shaped as an annular ring 10, having the abutting edges sewed together as indicated at 11. If desired, for certain uses, the tape may be cut, and formed as arcuate segments. The process of forming, cutting and pressing a woven tape into final shape is well understood in the art, and it is believed that a description of these steps is unnecessary.

In the process of fabrication of the woven tape, it desirably is formed in a multiple of inter-woven plies, designated at 13 and 14, on a suitable loom. The strands or threads of cotton forming the back or outer ply 14, are, prior to the weaving operation, impregnated with an oil-proof, hardened, synthetic resin, or equivalent binder, such as oil-proof drying oil varnish, Duprene compound and the like, while the strands of cotton forming the inner ply 13, are untreated. The tape having the outer ply of impregnated cotton strands is then heat pressed to flow and harden the binder which process is suitable when using synthetic resin or Duprene. When oil-varnishes are used, the tape is pressed to flow the binder and is then subjected to heat treatment for hardening. Materials such as glue and casein may also be employed as binders because of their oil-proof and binding qualities, in which case it is necessary only to dry the resultant product. After hardening of the binder, suitable apertures 15, may be punched into the element for attachment, such as by rivets, to a suitable mounting member.

In the friction material thus produced, the inner ply 13, composed of untreated cotton, is porous, soft and resilient, while the back or outer ply 14 is hard, dense, and reinforced to provide adequate strength so that the friction facing may be firmly secured to the mounting member and insure a fixed clearance of the operating surface indicated at 13ª of the inner ply 13.

The friction element represented in Figs. 4 to 6, is in the form of a band, 16, such as used in a brake, having inner and outer plies 17 and 18 respectively, the inner ply 17 being composed of untreated cotton threads having a soft, resilient, operating surface 17ª, and the outer surface 18, being composed of cotton threads impregnated with a binder to produce a hard, dense reinforced back or outer ply. The process of fabrication of this form of friction element is the same as above described. After the tape is shaped and cured, suitable apertures 19, are punched therein for attaching it to a suitable mounting, as by means of rivets.

The term "woven" as used herein and in the claims is intended to be accorded its broadest meaning, and is intended to include the form of interlacing of strands or threads, known as "braided".

Although I have disclosed a preferred embodiment of my invention, manifestly it is capable of modification and variation without departing from the spirit and scope thereof. I do not, therefore, wish to be understood as limiting my invention to the precise embodiment disclosed, except as I may be so limited in the appended claims.

I claim as my invention:

1. A clutch or brake facing element formed throughout of woven fibrous material, the fibre of one surface thereof comprising its operating surface being porous, resilient and untreated, and the fibres of the opposite surface comprising the mounting surface being reinforced with a hardened binder, to form a firm and dense strata capable of receiving attaching means for attaching the facing to a mounting.

2. A clutch or brake facing element adapted to maintain its effectiveness in the presence of oil and to substantially retain a fixed amount of clearance at the friction surface, the said element being formed throughout of woven fibrous material, and comprising a plurality of interwoven plies, at least one external ply thereof adapted to constitute its operating surface being soft and resilient and remaining untreated, and the remainder of the thickness of said element being reinforced with a hardened binder to form a firm and dense backing capable of receiving attaching means for attaching the facing to a mounting.

3. A clutch or brake facing element adapted to retain its effectiveness in the presence of oil adjacent its operating surface, comprising a friction element composed of woven fibrous material and leaving a porous, resilient untreated operating surface, the mounting surface of said element being of dense hardened texture capable of receiving attaching means for attaching the facing to a mounting and comprising an oil-resistant hardened reinforcing binder.

4. A clutch or brake facing element adapted to retain its effectiveness in the presence of oil adjacent its operating surface, comprising interwoven plies of cotton material, at least one external ply adapted to provide the operating surface being soft resilient and untreated, and the remainder of the thickness of the element being of a dense hardened texture capable of receiving attaching means for attaching the facing to a mounting member, and comprising an oil resistant hardened binder.

5. The method of producing a unitary plied form of friction material wherein one external thickness possesses characteristics differing from the opposed thickness, and is adapted to be firmly secured to a mounting surface and to operate in the presence of oil and to substantially retain its effective surface and thickness, which comprises weaving together a plurality of strands of fibrous material some of which are impregnated with an oil-resistant hardenable binder and the remainder are untreaded, the treated strands being caused to lie in one external strata and the untreated strands being caused to lie in the opposed external strata.

6. A clutch or brake facing element formed throughout of woven fibrous material, the fibre of one surface thereof comprising its operating surface being porous and resilient, and the fibres of the opposite surface comprising the mounting surface being reinforced with a hardened binder, to form a firm and dense strata capable of receiving attaching means for attaching the facing to a mounting.

7. A clutch or brake facing element adapted to maintain its effectiveness in the presence of oil and to substantially retain a fixed amount of clearance at the friction surface, the said element being formed throughout of woven fibrous material, and comprising a plurality of interwoven plies, at least one external ply thereof adapted to constitute its operating surface being soft and resilient, and the remainder of the thickness of said element being reinforced with a hardened binder to form a firm and dense backing capable of receiving attaching means for attaching the facing to a mounting.

EARL A. WALES.